June 17, 1930.    J. GELOSO    1,763,771

VARIABLE CAPACITY ELEMENT

Filed July 13, 1927

INVENTOR
John Geloso
BY
ATTORNEY

Patented June 17, 1930

1,763,771

UNITED STATES PATENT OFFICE

JOHN GELOSO, OF NEW YORK, N. Y., ASSIGNOR, BY MESNE ASSIGNMENTS, TO PILOT RADIO & TUBE CORPORATION, OF BROOKLYN, NEW YORK, A CORPORATION OF DELAWARE

VARIABLE-CAPACITY ELEMENT

Application filed July 13, 1927. Serial No. 205,315.

This invention relates to improvements in condensers particularly variable condensers employing a conductor and a dielectric.

Up to the present time several forms of fixed condensers have been manufactured wherein a conductor, particularly a sheet of metal foil and mica as a dielectric have been applied.

It is an object of this invention, however, to provide a condenser of a simple, compact design whose capacity is variable and adjustable throughout a wide range of values and whose operation at any point in this range will be constant under all conditions.

Further it is an aim of this invention to provide for a variable condenser whose constituent conductor and dielectric elements are enclosed within a casing formed of a phenolic condensation product and of which the conductor member is adapted by a variation of pressure imparted thereto to introduce in conjunction with the dielectric therebetween positioned, a variable capacitance.

Still further it is an aim of this invention to provide for a condenser comprising of a stamped metal conductor element in association with dielectric elements, of which the conductor elements being of flexible material formation are capable on the application or release of pressure to introduce required varied capacitance values.

Still further it is aimed to provide a variable condenser comprising alternately disposed mica and conductor members of which the conductor members comprise a series of flexible metal stampings having peripheral projections alternately extending angularly from a central plane whereby resilient contact is made by a conductor element with the dielectric member on opposite sides thereof and which contact is controllable by the pressure imparted by the conductor.

Further it is aimed to provide for a variable condenser comprising a pack formed of resilient conductors bearing against dielectric strips alternately positioned with respect to one another which pack is acted upon by pressure means to bring about any desired capacitance range. This pressure means causes variations of capacitance in one direction upon the tensioning of the resilient conductors, and which upon being rotated in opposing direction allows for the release or expansion of the resilient conductor plates whereby variable capacitance values in another direction may be attained.

Still further it is aimed to provide a condenser element wherein the dielectric and conductor pack is positioned within a chamber of an insulation casing of which alternate conductor members are interconnected to contact means on opposite sides of said chamber, which contact means also serve to seal the condenser element with the chamber.

In general this invention then provides for a novel form of variable condenser adapted for use in the radio industry wherein the application of pressure between the opposing extremities of the conductor and dielectric stack will provide for definite capacitance variation controllable to produce constant values.

These and other advantages, capabilities, and features of the invention will appear from the subjoined detail description of one specific embodiment therefore illustrated in the accompanying drawings, in which—

Figure 1:
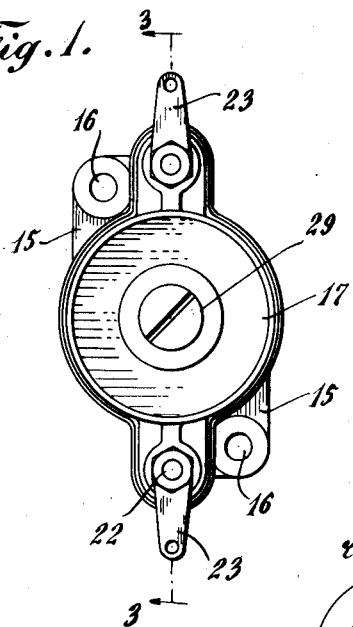
Fig. 1 is a plan view of the device.

Referring to the reference characters in the drawing, numeral 10 represents a casing comprising of a phenolic condensation product moulded so as to provide therein for a central cylindrical chamber 11 and two small chambers 12 and 13 leading off from the central chamber, within the smaller chambers 12 and 13 there adapted to be positioned bolt members 14 for a purpose to be later described. Formed integral with the base member 10, are a plurality of projecting fins 15 having apertures 16 therein for the passage there-through of fastening screws or bolts or other means adapted to attach the device to a panel or other portion of a radio receiver.

Cooperating with the base member 10 is a head member 17 comprising of a similarly moulded phenolic condensation product having a central cut out portion 33 and a plurality flange or projecting portions 19, which projecting portions have apertures 20 therein through which the bolt members 14 may pass and forming a bearing surface against which the nut members 21 and 22 between which there is positioned a conducting lug 23, may be connected to the bolt members 14 for maintaining the head member 17 in fixed relationship with the base member 10 and at the same time providing for electrical contact through the lead 23 from the bolt member 14 to the remainder of the circuit as will be later described.

Figure 6:
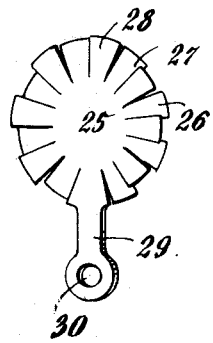
Fig. 6 is a perspective view of a conductor member.

Within the chamber 11 there adapted positioned alternating series of mica disks 24 and metallic conductor members 25. The conductor members as shown in Figs. 3 and 6 comprise stamped metal elements circular in configuration though the form of the same may be varied without departing from the scope of the invention, which conductor members 25 are so formed as to have their outer peripheries cut or stamped into radially extending sections 26 of which adjacent elements 27 and 28 are alternately bent in opposing angular directions so that the conductor member 25 which is of flexible metal may be adapted to alternately press all around their peripheries against the dielectric mica disk in part in one direction, and simultaneously press against the second dielectric mica disk in the other direction.

Figure 3:
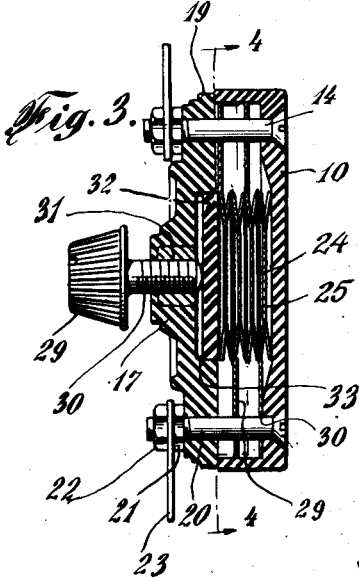
Fig. 3 is a side elevation in section along lines 3—3 of Fig. 1.

The conductor member 25 has a neck portion 29 having an aperture 30 therein by means of which the conductor may be positioned along the length of the conducting bolt members 14 so that electric contact may be made from the conductor to the bolt member 14 and thence from the nut member 21 and conducting lead 23 to the remainder of the circuit as shown in Figs. 3, as is shown in the drawing, alternate layers of conductor 25 are separated by the mica dielectric disks 24 so as to provide for the capacitance function of the device.

Figure 2:
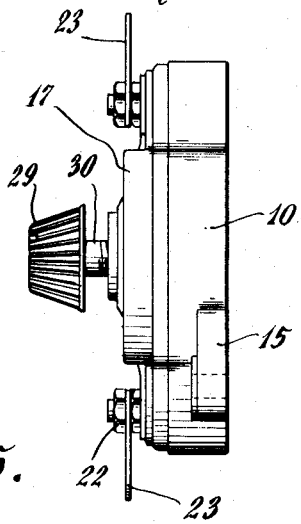
Fig. 2 is a side elevation of the device.
Figure 5:
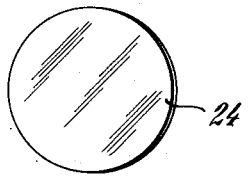
Fig. 5 is a perspective view of a disk member.
Figure 4:
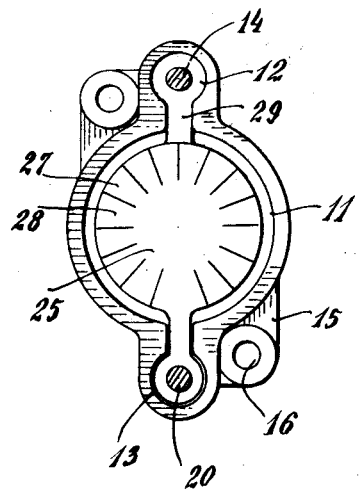
Fig. 4 is a plan view taken along lines 4—4 of Fig. 3.

Referring to Figs. 2, 3 and 4 pressure means are shown within the head member 17 which pressure means comprise a knob member 29 having attached thereto a screw threaded element 30 which screw threaded element cooperates with a metallic screw threaded nut 31 moulded within the head member 30 and which threaded member 30 is adapted to press within and against the pressure member 32 comprising a disk fitting within the cut out aperture 33 in the head member and against the respective conductor plates 25 and the mica disks or dielectric plates 24, so that movement in either direction of the pressure member 29 will cause the respective dielectric and conductor members to be compressed towards one another or be released from contact, the latter function being due to the resiliency of the conductor member 25 and the arrangement of alternately extending fins 27 and 28 pressing in opposing directions upon their expansion after being compressed.

It is obvious that various changes and modifications may be made to the details of construction without departing from the general spirit of the invention as set forth in the appended claims.

What I claim is:

1. A variable condenser comprising an insulating casing, a series of flexible conductor members, comprising metal disks, having their outer peripheries shaped into a series of segmental projections, adjacent projections being angularly disposed with respect to one another, and alternate projections being in the same plane, dielectric means interposed between adjacent conductor members, a pressure block positioned within said casing and in contact with the uppermost of said conductor members and means cooperating with said pressure block for urging the same towards the conductor member to compress the conductor members and dielectric means; said conductor members being adapted to expand on the withdrawal of pressure thereagainst whereby to vary the capacitance.

2. A variable condenser comprising an insulating casing, a series of flexible conductor members comprising metal disks having their outer peripheries shaped into a series of segmental angularly disposed projections, adjacent projections being in different planes and alternate projections being in the same plane, dielectric means interposed between adjacent conductor members, a pressure block positioned within said casing and in contact with the uppermost of said conductor members and rotating means cooperating with said pressure block for urging the same towards the conductor member to compress the conductor members and dielectric disks; said conductor members being adapted to expand on the withdrawal of pressure thereagainst.

3. A variable condenser comprising an insulating casing member, a series of alternately disposed conductor plates and dielectric disks, said conductor plates having the perimeters thereon stamped whereby to form a series of fins offset from the body of the plates, and angularly disposed of one another, alternate fins being in the same plane, said fins being adapted to form resilient contact with adjacent dielectric disks, means for compressing said conductor plates and dielectric disks, whereby to vary the capacitance of the device, said conductor plates being adapted to vary the capacitance by expansion upon release of said pressure.

4. A variable condenser comprising a casing member, a plurality of contact members extending through said casing, a chamber centrally disposed in said casing, alternate layers of conductor and dielectric members positioned in said chamber, said conductor members having projections, the projections of alternate conductor members being adapted to contact with opposite di-electric members, said conductor members comprising stamped metal disks having angular projecting fins formed on the perimeters thereof alternate fins being in the same plane and pressure means cooperating with said conductors and dielectric disks.

5. A variable condenser comprising a series of stamped metal members separated from one another by dielectric disks, the said conductor member comprising stamped metal elements having fins formed on their perimeter, adjacent fins being angularly displaced from one another, alternate fins being in the same plane, the contact between the conductors and the adjacent dielectric disks being through the fins.

6. A variable condenser, comprising an insulating casing member, contact terminals in said casing member, conductor and di-electric members, alternately positioned, within the said casing member, said di-electric members comprising circular disks and said conductor members, comprising resilient circular metal blanks, having adjacent segments along their peripheries, angularly disposed from one another, said blanks having integral conducting portions, alternate blanks being mounted on and carried by the terminals in said casing member, and means comprising a pressure block for compressing the respective conductor members, whereby to vary the capacitance of the condenser, said conductor members upon release of pressure, being adapted to expand.

7. In a di-electric condenser, the combination of a housing therefor, comprising two casing sections, secured together to provide a chamber, the means for securing said casing sections, together, forming terminals for the condenser plates in said chamber, di-electric means disposed between adjacent condenser plates, said condenser plates comprising circular disks having the outer peripheries thereof, formed of a series of adjacent angularly offset portions, alternate portions being in the same plane, and means for imparting pressure on the condenser, and di-electric plates whereby to vary the capacitance of the condenser.

8. In a di-electric condenser, the combination of a housing therefor, comprising two casing sections, secured together to provide a chamber, the means for securing said casing sections together, forming terminals for the condenser plates in said chamber, di-electric means disposed between adjacent condenser plates, said condenser plates comprising circular disks having the outer peripheries thereof, formed of a series of adjacent angularly offset portions, alternate portions being in the same plane, and means for imparting pressure on the condenser, and di-electric plates whereby to vary the capacitance of the condenser, said condenser plates having elongated strips, formed integral therewith, for interconnecting the same with the terminal means, alternate strips being connected to the same terminal means.

9. In an electric condenser, the combination of a housing therefor, comprising two casing sections, secured together through means forming terminals, and forming a chamber therebetween, substantially circular condenser plates and di-electric means, alternately disposed in said chamber, said chamber plates having their outer perimeters stamped to form segmental angular offset projections, adjacent projections being in opposite planes, alternate projections being in the same plane, and contacting with the di-electric on opposite sides of the respective condenser plates, whereby to impart flexibility to said condenser plates, means for imparting pressure to said condenser and di-electric plates, whereby to vary the capacitance of the condenser, alternate condenser plates, being mounted on and carried by the respective terminal members.

10. An electrical condenser comprising metal plates and di-electric plates therebetween, carried in an insulating chamber, alternate metal plates, being mounted on and carried by the terminals positioned in the chamber, said metal plates being substantially circular, and having the outer peripheries thereof, stamped to provide a series of alternately angular offset projections, whereby to provide for a flexing of the metal plates, adjacent the di-electric plates, upon the application of pressure to the condenser, whereby to vary the capacitance thereof.

JOHN GELOSO.